US011601949B2

(12) United States Patent
McFarlane et al.

(10) Patent No.: US 11,601,949 B2
(45) Date of Patent: Mar. 7, 2023

(54) DISTRIBUTED EDGE-ENVIRONMENT COMPUTING PLATFORM FOR CONTEXT-ENABLED AMBIENT INTELLIGENCE, ENVIRONMENTAL MONITORING AND CONTROL, AND LARGE-SCALE NEAR REAL-TIME INFORMATICS

(71) Applicant: KONINKLIJKE PHILIPS N.V., Eindhoven (NL)

(72) Inventors: Daniel Craig McFarlane, Cambridge, MA (US); Bryan Conroy, Cambridge, MA (US)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 17/055,173

(22) PCT Filed: Aug. 20, 2019

(86) PCT No.: PCT/EP2019/072194
§ 371 (c)(1),
(2) Date: Nov. 13, 2020

(87) PCT Pub. No.: WO2020/043538
PCT Pub. Date: Mar. 5, 2020

(65) Prior Publication Data
US 2021/0195596 A1 Jun. 24, 2021

Related U.S. Application Data

(60) Provisional application No. 62/723,512, filed on Aug. 28, 2018.

(51) Int. Cl.
H04W 72/06 (2009.01)
H04W 72/04 (2023.01)
(Continued)

(52) U.S. Cl.
CPC ...... H04W 72/0486 (2013.01); H04W 28/0268 (2013.01); H04W 72/0493 (2013.01); H04W 72/06 (2013.01); H04W 84/18 (2013.01)

(58) Field of Classification Search
CPC ......... H04W 72/0486; H04W 28/0268; H04W 72/0493; H04W 72/06; H04W 84/18; H04Q 9/00
See application file for complete search history.

(56) References Cited

U.S. PATENT DOCUMENTS

2004/0012491 A1* 1/2004 Kulesz ............... G08B 21/12
436/100
2007/0239862 A1* 10/2007 Bronez ................ H04L 41/12
709/201
(Continued)

FOREIGN PATENT DOCUMENTS

WO 2017100640 A1 6/2017
WO 2017106619 A1 6/2017
WO 2018009159 A1 1/2018

OTHER PUBLICATIONS

Winkler, T. et al., "TrustEYE. M4: Protecting the sensor—Not the camera," in Advanced Video and Signal Based Surveillance (AVSS), 2014 11th IEEE International Conference on, 2014, pp. 159-164.

(Continued)

Primary Examiner — Lakeram Jangbahadur

(57) ABSTRACT

A sensor device including a plurality of sensors producing sensor data, a storage device, a memory, a processor connected to the storage device and the memory, wherein the processor is configured to receive sensor data from the plurality of sensors, process the received sensor data from the plurality of sensors, receive external processing requests, perform external processing requests, and send external processing results.

8 Claims, 2 Drawing Sheets

(51) Int. Cl.
H04W 28/02 (2009.01)
H04W 84/18 (2009.01)

(56) References Cited

U.S. PATENT DOCUMENTS

2017/0060574 A1 3/2017 Malladi et al.
2017/0277521 A1* 9/2017 Sharma ................... G06F 8/40
2018/0007115 A1* 1/2018 Nedeltchev ............ H04L 67/02

OTHER PUBLICATIONS

Lewis, G.A., "Mobile Computing at the Edge: Keynote Summary," in Proceedings of the 2013 ACM Workshop on Mobile Development Lifecycle, New York, NY, USA, 2013, pp. 29-30.
Dey, A.K., "Understanding and using context," Pers. Ubiquitous Comput., vol. 5, No. 1, pp. 4-7, 2001.
Soto, J.A.C. et al., "CEML: Mixing and Moving Complex Event Processing and Machine Learning to the Edge of the Network for IoT Applications," in Proceedings of the 6th International Conference on the Internet of Things, New York, NY, USA, 2016, pp. 103-110.
Shekhar, S. et al., "Dynamic Resource Management Across Cloud-Edge Resources for Performance-Sensitive Applications," in Proceedings of the 17th IEEE/ACM International Symposium on Cluster, Cloud and Grid Computing, Piscataway, NJ, USA, 2017, pp. 707-710.
Perera, C. et al., "Fog Computing for Sustainable Smart Cities: A Survey," ACM Comput Surv, vol. 50, No. 3, p. 32:1-32:43, Jun. 2017.
Bonomi, F. et al., "Fog computing and its role in the internet of things," in Proceedings of the first edition of the MCC workshop on Mobile cloud computing, 2012, pp. 13-16.
Yi, S. et al., "A Survey of Fog Computing: Concepts, Applications and Issues," 2015, pp. 37-42.
Mao, Y. et al., "A Survey on Mobile Edge Computing: The Communication Perspective," ArXiv170101090 Cs Math, Jan. 2017.
Lewis, G.A., "Mobile Computing at the Edge (Keynote)," in Proceedings of the 1st International Conference on Mobile Software Engineering and Systems, New York, NY, USA, 2014, pp. 69-70.
Perera, C. et al., "Context aware computing for the internet of things: A survey," IEEE Commun. Surv. Tutor., vol. 16, No. 1, pp. 414-454, 2014.
Hu, Y.C. et al., "Mobile edge computing—A key technology towards 5G," ETSI White Pap., vol. 11, No. 11, pp. 1-16, 2015.
OpenFog Consortium Architecture Working Group, "OpenFog Architecture Overview," White Paper OPFWP001.0216, Feb. 2016.
Vaquero, L.M. et al., "Finding your way in the fog: Towards a comprehensive definition of fog computing," ACM SIGCOMM Comput. Commun. Rev., vol. 44, No. 5, pp. 27-32, 2014.
Banerjee, S., "Edge Computing in the Extreme and Its Applications," in Proceedings of the Eighth Wireless of the Students, by the Students, and for the Students Workshop, New York, NY, USA, 2016, pp. 2-2.
Lin, Y. et al., "Enhancing edge computing with database replication," in Reliable Distributed Systems, 2007. SRDS 2007. 26th IEEE International Symposium on, 2007, pp. 45-54.
Prasad, A.S. et al., "RAERA: A Robust Auctioning Approach for Edge Resource Allocation," 2017, pp. 49-54.
Avino, G. et al., "Characterizing Docker Overhead in Mobile Edge Computing Scenarios," 2017, pp. 30-35.
Cuervo, E. et al., "MAUI: making smartphones last longer with code offload," in Proceedings of the 8th international conference on Mobile systems, applications, and services, 2010, pp. 49-62.
Hu, W. et al., "Quantifying the Impact of Edge Computing on Mobile Applications," 2016, pp. 1-8.
Dubey, H. et al., "Fog Data: Enhancing Telehealth Big Data Through Fog Computing," in Proceedings of the ASE BigData & SocialInformatics 2015, New York, NY, USA, 2015, p. 14:1-14:6.
Lopes, J. et al., "A model for context awareness in ubicomp," in Proceedings of the 18th Brazilian symposium on Multimedia and the web, 2012, pp. 161-168.
Surve, A.R. et al., "Pervasive Context-Aware Computing Survey of Context-aware ubiquitous middleware systems," Int. J. Eng., vol. 10, No. 1, p. 2017.
Calo, S.B. et al., "Distributed Intelligence: Trends in the Management of Complex Systems," in Proceedings of the 22Nd ACM on Symposium on Access Control Models and Technologies, New York, NY, USA, 2017, pp. 1-7.
Greenberg, A. et al., "The cost of a cloud: research problems in data center networks," ACM SIGCOMM Comput. Commun. Rev., vol. 39, No. 1, pp. 68-73, 2008.
Borcoci, E. "Fog Computing, Mobile Edge Computing, Cloudlets—Which One?," in The Eleventh International Conference on Systems and Networks Communications, Rome, Italy, 2016.
Cisco Systems, "Cisco IOx," Cisco Systems, Data Sheet 1456958531920692, Jul. 2017.
Patel, R.K. et al., "A UK perspective on smartphone use amongst doctors within the surgical profession," Ann. Med. Surg., vol. 4, No. 2, pp. 107-112, Jun. 2015.
Yeo, K., et al., "Pitfalls and Security Measures for the Mobile EMR System in Medical Facilities," Healthc. Inform. Res., vol. 18, No. 2, p. 125, 2012.
Sametinger, J. et al., "Security challenges for medical devices," Commun. ACM, vol. 58, No. 4, pp. 74-82, Mar. 2015.
Sansurooh, K. et al., "BYOD in ehealth: Herding cats and stable doors, or a catastrophe waiting to happen?," in Healthc Inform Res, Perth, Western Australia, 2014, pp. 28-34.
Nawaz, T. et al., "User-centric, Embedded Vision-based Human Monitoring: A Concept and a Healthcare Use Case," in Proceedings of the 10th International Conference on Distributed Smart Camera, New York, NY, USA, 2016, pp. 25-30.
Truong, N.B. et al., "Software defined networking-based vehicular adhoc network with fog computing," in Integrated Network Management (IM), 2015 IFIP/IEEE International Symposium on, 2015, pp. 1202-1207.
Cho, J. et al., "ACACIA: Context-aware Edge Computing for Continuous Interactive Applications over Mobile Networks," in Proceedings of the 12th International on Conference on Emerging Networking EXperiments and Technologies, New York, NY, USA, 2016, pp. 375-389.
Shi, W. et al., "Edge Computing: Vision and Challenges". IEEE Internet of Things Journal, vol. 3, No. 5, Oct. 2016.
Dey, S. et al., "Robotic SLAM: A Review from Fog Computing and Mobile Edge Computing Perspective," in Adjunct Proceedings of the 13th International Conference on Mobile and Ubiquitous Systems: Computing Networking and Services, New York, NY, USA, 2016, pp. 153-158.
Catlett, C.E. et al., "Array of Things: A Scientific Research Instrument in the Public Way: Platform Design and Early Lessons Learned," in Proceedings of the 2Nd International Workshop on Science of Smart City Operations and Platforms Engineering, New York, NY, USA, 2017, pp. 26-33.
Lewis, G.A. et al., "Cloudlet-based cyber-foraging for mobile systems in resource-constrained edge environments," in Companion Proceedings of the 36th International Conference on Software Engineering, 2014, pp. 412-415.].
Satyanarayanan, M., "The role of cloudlets in hostile environments," presented at the MCS'13, Taipei, Taiwan, 2013.
Wang, S. et al., "Emulation-based study of dynamic service placement in mobile micro-clouds," in Military Communications Conference, MILCOM 2015-2015 IEEE, 2015, pp. 1046-1051.
International Search report for PCT/EP2019/072194 dated Aug. 20, 2019.

* cited by examiner

DISTRIBUTED EDGE-ENVIRONMENT COMPUTING PLATFORM FOR CONTEXT-ENABLED AMBIENT INTELLIGENCE, ENVIRONMENTAL MONITORING AND CONTROL, AND LARGE-SCALE NEAR REAL-TIME INFORMATICS

CROSS-REFERENCE TO PRIOR APPLICATIONS

This application is the U.S. National Phase application under 35 U.S.C. § 371 of International Application No. PCT/EP2019/072194, filed on Aug. 20, 2019, which claims the benefit of U.S. Patent Application No. 62/723,512, filed on Aug. 28, 2018. These applications are hereby incorporated by reference herein.

TECHNICAL FIELD

Embodiments described herein relate generally to sensor networks located in work environments.

BACKGROUND

Some work environments are connected with a dynamic local physical context of point-of-work location and activities. Settings such as these may be referred to as 'edge environments' and can include work activities that contribute to the success of an organization. For these activities, successful decision-making and task performance are dependent on continual context awareness about changing situations. Changes in a local environment must be quickly detected, analyzed, and addressed often within a few seconds. Situations to be monitored may include (A) environmental conditions such as air temperature, air humidity, light levels, noise levels, and/or the presence of hazardous gasses, (B) movement of objects, such as people walking, falling, getting up, movement of wheeled carts, robot arms, and/or vehicles, (C) the activities of nearby people, such as talking, gesturing, use of artefacts, and/or eye gaze, (D) the status of nearby people, such as their health vital signs, emotional attitude, mental state, or safety, and (E) the status of various workplace devices, equipment, and systems.

Multiple different industries are transitioning computing resource solutions from on-premises private IT server rooms to off-premises shared cloud datacenters. Limitations with these cloud architecture solutions may make cloud-based solutions inappropriate as platforms to support dynamic context-dependent activities at a point-of-work. Problems can include unreliable QoS, long and unpredictable end-to-end network latencies, extremely-high sensor data collection rates that outpace available bandwidth to move data to the cloud, costs (time, money, network traffic) of transmitting data to off-premises to the cloud, added security and privacy risks related to data transmission, trust of mobile devices, battery power of mobile devices, and poor support for mobility and location-awareness.

SUMMARY

A brief summary of various embodiments is presented below. Some simplifications and omissions may be made in the following summary, which is intended to highlight and introduce some aspects of the various embodiments, but not to limit the scope of embodiments described herein. Detailed descriptions of embodiments adequate to allow those of ordinary skill in the art to make and use the inventive concepts will follow in later sections.

Embodiments include a sensor device including a plurality of sensors producing sensor data, a storage device, a memory, a processor connected to the storage device and the memory, wherein the processor is configured to receive sensor data from the plurality of sensors, process the received sensor data from the plurality of sensors, receive external processing requests, perform external processing requests, and send external processing results.

The processor may be further configured to receive external sensor data and process the external sensor data.

The processor may be further configured to run cluster computing software so that the processor is part of a distributed cluster computing platform.

The processor may be further configured to connect to a new sensor added to the senor device and to receive data from the new sensor.

Processing the received sensor data may include sending cluster computing processing requests to other sensor devices to perform a portion of the processing of the external processing request and receiving cluster computing processing results from the other sensor devices.

Performing the external processing requests may include sending cluster computing processing requests to other sensor devices to perform a portion of the processing of the received sensor data and receiving cluster computing processing results from the other sensor devices.

Processing the received sensor data may include sending cluster computing processing requests to cloud resources to perform a portion of the processing of the external processing request and receiving cluster computing processing results from the cloud resources.

Performing the external processing requests may include sending cluster computing processing requests to cloud resources to perform a portion of the processing of the received sensor data and receiving cluster computing processing results from the cloud resources.

Embodiments also include a method of processing data performed by a sensor device including a processor and a plurality of sensors, including receiving sensor data, by the processor, from the plurality of sensors, processing, by the processor, the received sensor data from the plurality of sensors, receiving, by the sensor device, external processing requests, performing, by the processor, external processing requests, and sending, by the sensor device, external processing results.

The method may include receiving, by the sensor device, external sensor data and processing, by the processor, the external sensor data.

The method may include running, by the processor, cluster computing software so that the processor is part of a distributed cluster computing platform.

The method may include adding a new sensor to the senor device and connecting the new sensor to the processor.

BRIEF DESCRIPTION OF THE DRAWINGS

Additional objects and features of embodiments described herein will be more readily apparent from the following detailed description and appended claims when taken in conjunction with the drawings. Although several embodiments are illustrated and described, like reference numerals identify like parts in each of the figures, in which:

DETAILED DESCRIPTION

Figure 1:
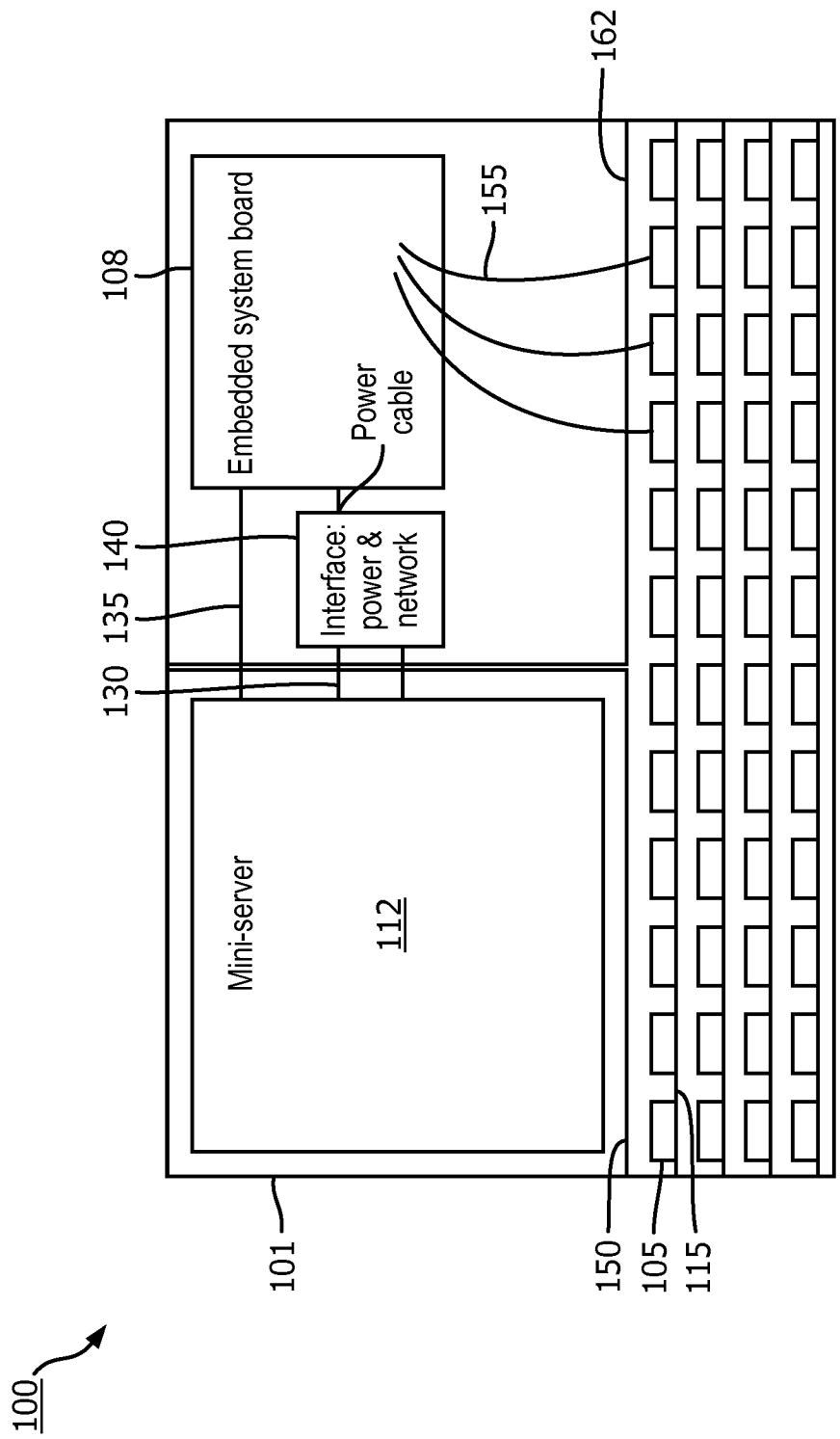
FIG. 1 illustrates a sensor device in accordance with embodiments described herein.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or illustrated herein, embody the principles of embodiments described herein and are included within its scope. Furthermore, all examples recited herein are principally intended expressly to be for pedagogical purposes to aid the reader in understanding the principles of the embodiments described herein and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

In a work environment, an introduction of sensor automation and near real-time analytics can off-load work of collecting and processing measurements, and free workers to focus on higher-level issues. Embodiments described herein include delivery of high-quality sensing of activity context as well as high power processing capability at point-of-work locations. When multiple units such as sensor devices are networked together into what may be called a cluster, embodiments provide a highly-scalable edge computing distributed datacenter. Instead of trying to stretch conventional cloud computing to better service edge sensor locations, embodiments may inject cloud-scale computing hardware resources into sensor platforms. This injection may eliminate cloud-related distances between a local place for data collection and the remote processing thereof, which used to take place at some distance. Installations of devices across a worksite may provide workers with near real-time ubiquitous context-aware informatics and human-computer interaction (HCI) and an economical enterprise-level computing resource for advanced big-data analytics. This new local distributed datacenter may be a processing resource used by others in the workplace site to carry out other processing intensive data analytics functions.

Field observations have revealed understanding and insight about problems related to environmental monitoring, ambient intelligence, context-based informatics, and fog computing. Embodiments described herein combine a set of technologies into a system to solve problems discussed herein and other problems that may be known to those skilled in art.

FIG. 1 illustrates a sensor device 100 in accordance with embodiments described herein. The sensor device 100 may combine a heavily-resourced point-of-work edge computing server within a high-definition multi-channel context sensor system. The sensor device 100 may be small, inexpensive, and can be permanently installed at each point-of-work location across an entire worksite (inside buildings, outdoors, or in vehicles). An installation or location can include hundreds of the sensor devices 100 distributed spatially, with all the sensor devices 100 networked together into one interconnected edge computing network, or cluster. This network may represent a full on-premises distributed datacenter with optional fog-based connection to external cloud resources.

The sensor device 100 may be made of a tamper-resistant enclosure 101 that may be fix-mounted to a surface within the work edge-environment near the point of work. The enclosure 101 may have a tamper-resistant service door with a lock. The enclosure 101 may have tamper-resistant interfaces for permanent connection to power and network. The enclosure 101 may include a mount for a mini-server 112, a mount for an embedded system board 108, and a series of mounts for sensor modules and cameras. There may be a heat barrier 150 between sensors and the mini-server 112. The mini-server may also include a processor, system interface boards, data storage, and server-scale amounts of random-access memory (RAM) to improve the processing capability of the system.

FIG. 1 illustrates the front view of the sensor device 100 with a cover door open to reveal the contents. The thermal barrier 150 may shield a portion of the sensor device 100 from heat generated by the mini-server 112. Rows of sensor mounts 115 support sensor modules 105. Although FIG. 1 illustrates all sensor mounts 115 filled with sensor modules 105 (4 rows of 12=48 modules), an application may include fewer than this amount. Each sensor module 105 may be connected to the embedded system board 108 through sensor cables 155. Three such cables are illustrated for brevity. Different configurations or all the sensor modules 105 may be so connected. The embedded system board 108 may be connected directly to the mini-server 112 through a data cable 135 (e.g. USB). A power and network interface component 140 may connect the sensor device 100 externally to external power and network resources. It also serves as the internal interface for connection for power and network to the mini-server 112 and for power to the embedded system board.

The mini-server 112 may occupy substantially a full thickness of the sensor device enclosure 101. The embedded system board 108 may occupy substantially a back half of the thickness of the device enclosure 101. In front and over the embedded system board 108 may be a second level mounting deck 162. This mounting deck 162 deck may hold camera sensors and any other sensors that are too large to be accommodated in the smaller mounting rows. Some camera sensors connect to the embedded system board, while others connect directly to the mini-server.

The sensor device 100 may be permanently mounted on a surface at the point-of-work (e.g., wall, ceiling, column, etc.) with cameras and other sensors aimed to cover the field of view of the work environment. The device may be provided access to power and network connection at its installation location. For example, in a hospital patient room, the device would be mounted high on the wall opposite the patient's bed, or on the ceiling above the patient's bed, with un-occluded field to have maximal potential to cover the different activities that will take place in this point-of-work space. The device mount may include a flexible gimbal to enable the device to be turned and/or tipped to direct sensors at a location.

The sensor device 100 may be upgraded in the field with new sensors. Such sensors may be easily connected to any available sensor mount 115. Further, if the sensor needs access to the external environment of the sensor device 100, the sensor cover may be modified or replaced to provide an opening for the new sensor. This allows the sensor device 100 to add new capabilities, to upgrade existing capabilities (e.g., upgrading to a better higher resolution video camera), or to repair failed sensors.

The sensor device 100 may be installed to be as unobtrusive as possible. This includes being out of the way of all workflow and physical safety concerns. Sensor functions are performed completely automatically in a continuous (24/7/365) manner. No hands-on maintenance of the sensor device 100 may be required. Sensor data is automatically collected on a periodic cycle per a configuration that can be optionally revised at runtime. This cycle is controlled by a digital clock that is included in the embedded system board. A continuously-running software program on the mini-server includes a thread/process that reads the data coming from the embedded system board and then processes the data.

The sensor device 100 via its mini-server 112 is part of a distributed computing platform that can deliver highly-flexible processing and storage of data as needed for local applications. A virtual unified data environment with data across all devices is available for any organization-level processing. The platform includes an end-user development environment to enable users to develop and run custom analytics across whatever scale of data they select. A set of the sensor devices 100 may be networked together and deployed across a worksite into an informatics platform.

Cloudlets and other edge computing platforms may be located at an internet-edge to bridge service delivery/usage between user devices and off-premises cloud resources. Embodiments described herein may also be in direct contact with a data collection mechanism directly at a physical point-of-work. This decreased distance may eliminate distances between a site of data collection and processing of the data to maximize quality of service (QoS) in supporting front-line workers in edge-environments. Eliminating the need for off-premises computing resources also enables a client to maintain privacy in sensitive data collection use cases (e.g., private patient healthcare data). In addition, transferring sensitive data to off-premises resources may require complicated de-identification/encryption steps, which could further increase the latency between data collection and time-sensitive context-aware services.

Groups of comprehensive sensor devices 100 may be designed to be fixedly mounted across a worksite at point-of-work edge environments and then networked together in a cluster. Potentially thousands of individual sensor devices 100 may each run cluster application software via point-of-work sensor platforms and function in unison or in groups to deliver near real-time enterprise-wide context awareness for (A) a local environmental monitoring and control solution, (B) an enterprise-level ubiquitous computing platform for context-based informatics services, (C) a highly-scalable edge computing serverless organizational distributed data center, and (D) optional fog computing integration with cluster computing resources from the edge device itself.

Different categories of existing technologies may be leveraged for the construction of each sensor device 100. The sensor device 100 may include hardware infrastructures, software infrastructures, informatics algorithms, and human-systems integration. Hardware infrastructures may combine the mini server 112 with server-level capacity, the mature general-purpose embedded system board 108, a large number and a variety of electronic sensor modules 105 (e.g., environmental, motion, activities, system status, including the status of people, and wearables), multiple different types of image sensors, and an indoor positioning system (IPS). Software infrastructure may include operating-system-level virtualization and containers, middleware, union mount unified data environment, paravirtualization, distributed databases, and both edge and fog information security, and supports use of the edge computing platform for fog computing and on-premises FaaS (function as a service), PaaS (platform as a service), and CaaS (content as a service). Through fog computing infrastructure, embodiments described herein may contribute to hybrid architecture approaches that optionally include cloud computing. Advanced algorithms may include programs for context-aware services for computer vision, ambient intelligence, ubiquitous computing, data science, machine/deep learning, automation, semi-automation, and recommender systems. Human-systems integration (HSI) may support a wide variety of human-computer interaction (HCI) at edge work locations, including user interfaces (UI), work activity models, user models, decision-support systems, and end-user development (EUD). HSI may include custom combinations of mobile UI, desktop UI, device-based UI, wearable UIs, virtual reality (VR), augmented reality (AR), and mixed-reality (MR) solutions.

In one example application, an audio sensor may capture audio information in a hospital intensive care unit (ICU) patient room. The audio may be processed to determine if medical workers are complying with unit policies and best practices, to detect the operation of various machines, to detect machine alarms, or even to analyze conversations taking place in the ICU. In another application, a video camera may be used to capture video in the ICU. The video may be analyzed to determine staff activity types and log actions. The video may be analyzed to detect and identify family members. Also, the video may be analyzed for vital sign monitoring.

Embodiments described herein may include a platform configured to enable desired sensing and analytics. Embodiments may combine a high-quality sensing platform and highly-resourced edge computing platform. Possible applications include hospitals (wherein one device may be installed in every room), skilled nursing facilities, nursing homes, rehabilitation centers, factories (such as one device installed at every work location), schools, universities, hotels, shopping malls, airports, mobile workplaces, work vehicles, public transportation systems, private homes, and the like.

Embodiments may include an alternative use case that addresses not only consumerism or socializing, but on supporting front-line workers to perform crucial activities at the point-of-work.

Figure 2:
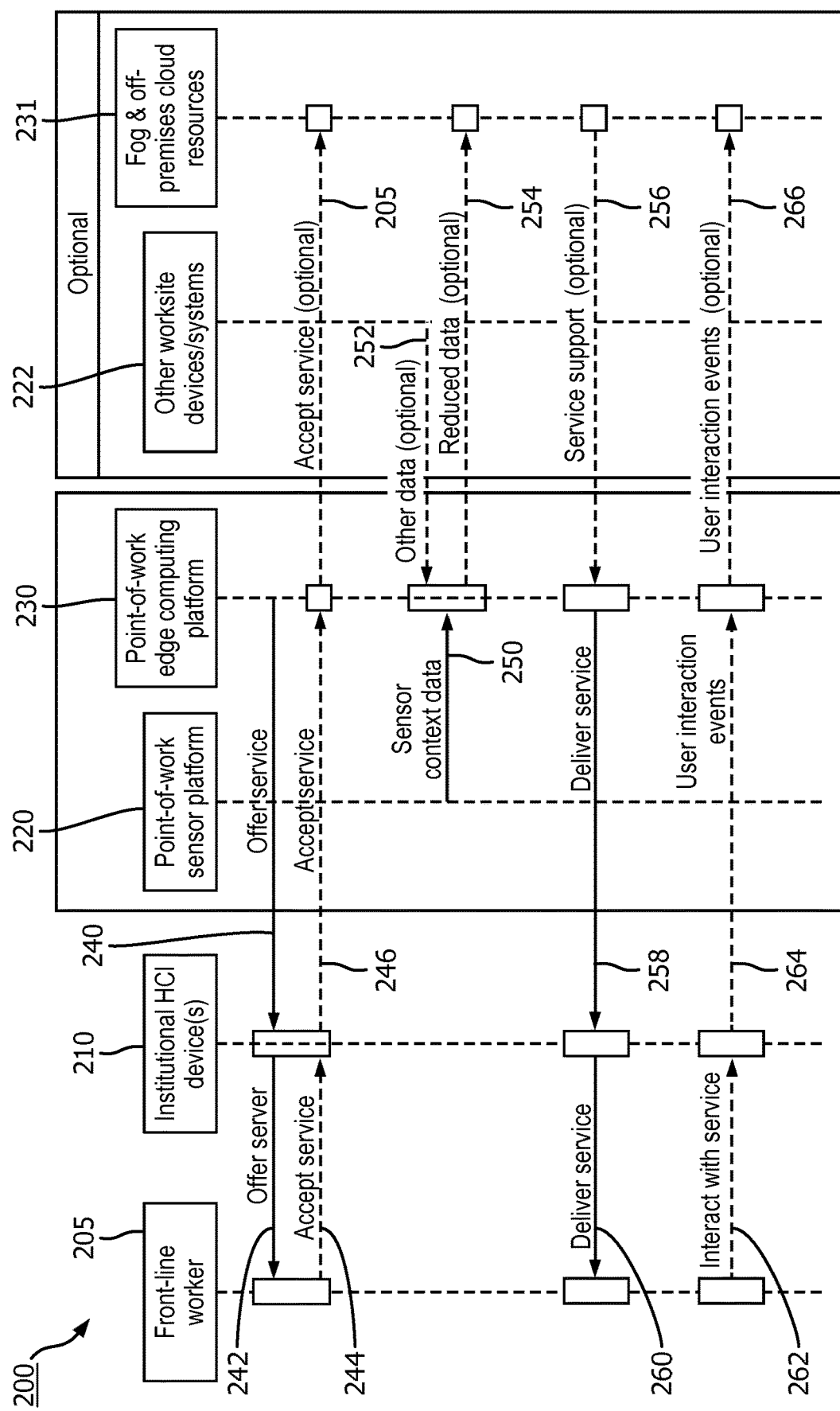
FIG. 2 illustrates a use case for work-critical processing of data in edge environments in accordance with embodiments described herein.

FIG. 2 illustrates a use case 200 for work-critical processing of data in edge environments in accordance with embodiments described herein. In a use case, an organization responsible for performing work in a dynamic edge-environment (e.g., hospital, factory, etc.) may desire to provide front-line work staff 205 with real-time context-aware informatics support. Workers access these informatics services through a homogeneous set of institution-provided HCI devices 210 (e.g., computer terminals) at the point-of-work to improve decision-making and task performance and perform custom exploratory analysis of big data. These analytics can optionally include data from other devices/ systems in the worksite. These analytics can also optionally include processing support from off-premises fog and cloud resources.

Instead of trying to stretch conventional cloud computing to better service edge sensor locations, embodiments described herein injects an entire cloud-scale computing hardware resource directly into the sensor platform 220 (and optional other work devices/systems 222) itself. The sensor platforms 220 and 222 include all the sensor capabilities of the combined sensor devices 100 installed in a unit or a worksite. Cluster application software may allow multiple sensor devices 100 having sensor platforms 220 to act like a single machine. For a large compute job that requires substantial time or computing resources, the cluster application software running on a sensor platform 220 may split up the job and distribute it to multiple individual sensor devices 100 as if they were a single computer. This local cluster computing permits a large job to be completed faster and more securely than sending such a job to a remote cloud system.

Installations of these sensor devices 100 across a worksite can provide workers with near real-time ubiquitous context-aware informatics and human-computer interaction (HCI), and an economical enterprise-level computing resource for advanced big-data analytics. These devices may combine a heavily-resourced point-of-work edge computing server 230 (and optional computing resources 232) within a high-definition multi-channel context sensor system. The optional computing resources may include other point-of-work edge computing capabilities in other sensors or other fog and off-premises cloud computing resources. It is small, inexpensive, and can be permanently installed at every point-of-work location across an entire worksite. An installation can include hundreds of these sensor devices 100 distributed spatially, with all devices networked together into one interconnected edge computing network. This network represents a full on-premises distributed datacenter with optional fog-based connection to external cloud resources. Also, to ensure delivery of reliable support for critical work, this platform includes a self-auditing system to automatically detect any problems, and infrastructure for optional redundant storage and computing.

The system of FIG. 2 may provide services to a user as follows. The point-of-work edge computing platform 230 may offer a service 240 to the HCI device 210. The HCI device 210 may present the offer of service 242 to a user 205, for example, on a computer screen. The user 205 accepts the service 244, and the HCI device 210 communicates the acceptance of service 246 back to the point-of-work edge computing platform 230. If the point-of-work edge computing program 230 needs additional computing resources to perform the service, it may send notification 248 to the optional computing resources 232. Next, the point-of-work edge computing platform 230 receives sensor data 250 from the point-of-work sensor platform 220 and optionally may also receive other data 252 from the other worksite devices and systems 222. If optional computing resources 232 are used, the point-of-work edge computing platform 230 may send data 254 to the optional computing resources 232. In that case, the point-of-work edge computing platform 230 receives service support 256 from the optional computing resources 232. The point-of-work edge computing platform 230 then delivers the service 258 to the HCI 210, and the HCI 210 delivers the service 260 to the user 205. Then the user 205 may interact with the service 262 via the HCI 210, and the HCI 210 then sends the user interaction events 264 to the point-of-work edge computing platform 230. If needed, the point-of-work edge computing platform 230 will send the user interaction events 266 to the optional computing resources 232.

A computing architecture is described here for on-premises edge computing solely comprised of networked edge devices that (A) continuously collect multi-channel high volume detailed measurement data of the local environment/situation context, and (B) function as a heavy-weight edge computing node with substantial general-purpose computer resources for data storage, dedicated edge-related analytics, and general distributed computing resources.

To achieve a goal of eliminating the distance between data collection and its processing, the embodiments described herein may bring two elements into direct physical integration within a single device enclosure.

A context sensor system may integrate an optimal number of different electronic sensors appropriate for an edge-environment application. The set of specific set of individual sensors is dependent on the worksite requirements for context-awareness. However, the sensor system may support any needed combination (e.g., environmental, motion, activities, system status (including status of people), and wearables), multiple different types of image sensors, indoor positioning systems (IPS), etc.). Embodiments include a default set of sensors as a baseline for any application. This default set includes sensors for air temperature, air humidity, light levels, and sound levels. Additional sensors may be added before or after the installation of the sensor devices.

A highly-resourced mini-server (similar in capacity to a cloudlet) configured with software infrastructure to enable both local processing of the data collected by the device's on-board sensor system, and to participate in distributed computing across a network of multiples of these devices. Software is installed on the highly-resourced mini-servers to enable the formation of this software infrastructure and to enable the sharing of processing resources to carry the processing associated with various services.

As discussed herein, embodiments enable novel context-enabled services at the point-of-work for edge environment worksites. This may include a rich set of potential services, including decision aids, attention aids, diagnostic aids, intelligent control of work processes, intelligent alerts, machine vision, automated modeling through machine learning, augmented reality (AR), virtual reality (VR), mixed reality (MR), or simulation, etc.

Embodiments may provide unifying and integrated intelligence to guide use of a set of 'dumb' devices/tools. Embodiments may enable scientific discovery of correlations and causations of context changes on work productivity, outcomes, and safety.

Hardware elements may include a mature general-purpose embedded system board (e.g., Arduino DFRduino RoMeo V1.1) with a set of interfaces for connecting with sensor modules. A set of electronic sensor modules (e.g., the DFRobot Gravity Series) selected as appropriate for the application of this platform. The minimal default set includes four characteristic including light, sound, temperature, and humidity. This set could potentially include dozens of sensor modules. A set of camera sensors (e.g., CMUcam5 Pixy) selected as appropriate for the application along with the cables to connect all sensors and cameras to the embedded system board.

Software includes Embedded systems software application to manage collection of data from sensors and communicate the data and derived data to the mini-server through USB.

Advanced algorithms that may be implemented on the group of sensor devices may include a set of algorithms for analyzing streaming data from sensors. These algorithms are encoded as cross-compiled software uploaded to the primary embedded system board main processor. A set of algorithms for analyzing streaming data from sensors. These algorithms are pre-loaded into the hardware of the sensor modules or camera sensors themselves.

The Mini-server cloudlet elements may include hardware such as a heavily-resourced mini-server with server-level computing capacity (e.g., Intel NUC6i3SYH, with Intel Core i3, 32 GB RAM, and 2 TB HD) and desktop-level I/O interfacing (e.g., Intel Iris 540 graphics, USB 2.0, USB 3.0, HDMI, Ethernet, Wifi, Bluetooth, etc.). The hardware may include a power cord, Ethernet cable, and a set of camera sensors (e.g. Logitech c615 full HD web cam) selected as appropriate for the application. Cables such as USB cables may connect each camera to the mini-server.

Software on the Mini-servers may include a full-scale network-centric OS (e.g., Ubuntu Linux). A set of analytics infrastructure software may be selected as appropriate for the application to support use of the mini-server as a flexible analytics platform for both local processing and distributed processing. A set of distributed computing software infrastructures selected as appropriate for the application (e.g., operating-system-level virtualization and containers, middleware, union mount unified data environment, para-virtualization, distributed databases), support for edge computing and fog computing for FaaS (function as a service), PaaS (platform as a service), and CaaS (content as a service). A set of information security technologies to protect data and processing both on the device and across a network of devices (e.g., Symantec Critical Systems Protection (CSP), and Datacenter Security (DCS)).

Advanced algorithms include A set of algorithms for analyzing data from sensors selected as appropriate for the application (e.g., context-aware services for computer vision, ambient intelligence, ubiquitous computing, data science, machine/deep learning, automation, semi-automation, and recommender systems).

Human-Systems Integration (HSI) includes Support interactive user interfaces (UI) for a set of human-computer interaction (HCI) devices at the edge-environment point-of-work (e.g., desktop user interfaces (UI), mobile UI, device-based UI, wearable UIs, virtual reality (VR), augmented reality (AR), and mixed-reality (MR) solutions). A set of HSI software to support the delivery of HCI services selected as appropriate for the application (e.g., user models, work activity models, context models. A set of HSI software to support end-user development (EUD) as selected as appropriate for the application.

Embodiments may include a set of additional wireless sensors (e.g., wearables, or indoor positioning systems (IPS)) selected as appropriate for the application. Embodiments may include a set of algorithms for analyzing streaming data from sensors. These algorithms are pre-loaded into the hardware of the sensor modules or camera sensors themselves.

Data communication may be formatted using existing open standard protocols. Examples include JSON, YAML, XML, SPAPjr, S-Expressions, HL7, FHIR, SOAP, RDF triples, etc.

Any distance between where the data is generated and where it is processed may pose a threat to the feasibility of delivering near real-time context-aware services. Embodiments described herein may eliminate this distance in a novel way that simultaneously delivers the added benefit of a large-scale computing resource for big data exploration.

Embodiments described herein provide solutions to many problems previously experienced in the art. Previously, there has been delay in delivering results. Remote centralized computing causes delay of analytics results (a QoS problem). Embodiments described here have determined that data collection rates at the edge have outpaced network communications bandwidth. Embodiments minimize the need to transmit the data across the network by moving the analytics processing to the data at the edge.

In the past, there has been unreliability of delivering of results. Remote centralized computing has reliability problems (a QoS problem). Embodiments described here have determined that off-premises approaches are dependent on public internet resources that are unreliable. Embodiments may minimize or eliminate the need for use of public internet resources by moving the computing hardware infrastructure to the edge location.

Previously, the cost of centralized on-premises data centers has been unacceptable. Remote centralized computing requires expensive data centers. Embodiments described here have determined server-scale computing hardware is now available in mini-server format. Information technology can be managed remotely and/or automated. Embodiments may minimize the need for a central data center by moving computing hardware infrastructure to the edge location.

Information security risks from transmitting protected data have been unacceptable. Remote centralized computing causes risks to information security. Embodiments described here have determined that network data transmission is a potential target for information security (INFOSEC) attack. Embodiments reduce exposure of data to potential INFOSEC attack by minimizing data transmission across the network. Embodiments include software security mechanisms and include device container hardware security mechanisms.

Previously, many limitations of stand-alone device solutions have been unacceptable. Device-based computing does not support analytics of data from multiple locations. Device-based computing cannot dynamically scale computer resources. Device-based computing does not facilitate analytic updates, configuration control, or support off-box UI services. Embodiments described here have determined that stove-piped 'boxes' do not support integrated analytics. Stove-piped 'boxes' do not support distributed computing, and stove-piped 'boxes' do not support enterprise-level IT management. Embodiments provide network-integrated edge devices support analytics of data across multiple edge locations, network-integrated edge devices form a scalable enterprise-wide distributed computing resource, and network-integrated edge devices enable unified IT management, configuration management, and enterprise-level UI services.

The cost of off-premises cloud computing has been unacceptable. Cloud computing is not an economical solution for continuous edge-based data collections and analytics. Embodiments described here have determined that cloud solutions do not fit the requirements of continual 24/7 edge-based work. Embodiments provide a heavy-weight edge computing platform that includes the edge sensor systems.

Previously, the cost of a device-centric Internet-of-Things (IoT) has been unacceptable. The IoT vision of ambient intelligence across many different devices is not economical. Embodiments described here have determined that it is not economical for all stand-alone devices in highly-regulated edge work locations to add IoT interfacing capabilities. Embodiments provide middleware to connect all 'dumb' devices to one IoT 'smart' edge computing system.

In the past, workflow conflicts caused by sets of 'Stove-Piped' services have been unacceptable. Sets of 'stove-piped' devices cause workflow conflicts. Embodiments described here have determined that a lack of high-level integration of device functions does not enable combined use of multiple devices in context-aware ways. Embodiments provide an introduction of a context-aware informatics platform that delivers 'smart' device use services to users, so they can coordination their use of multiple devices.

Previously, existing poor work safety has been unacceptable. Poor informatics support for front-line workers causes safety hazards. Embodiments described here have determined that workers cannot perform safely in highly dynamic situations without good information. Embodiments provide real-time context-aware decision-aid services.

Embodiments provided herein include a unique platform to deliver environmental sensing, context-aware services, and a flexible large-scale flexible distributed computing resource for big data exploration to any edge-environment worksite. It could function as a platform of convenience for every type of Philips informatics. Example possible applications include hospitals (one device installed in every room), skilled nursing facilities, nursing homes, rehabilitation centers, factories (one device installed at every work location), schools, universities, hotels, shopping malls, airports, mobile workplaces, public transportation systems, private homes, etc.

Although the various exemplary embodiments have been described in detail with reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

The invention claimed is:

1. A sensor device, comprising:
a plurality of sensors producing sensor data;
a storage device; a memory;
a processor connected to the storage device and the memory, wherein the processor is configured to:
receive sensor data from the plurality of sensors;
process the received sensor data from the plurality of sensors;
run cluster computing software so that the processor is part of a distributed cluster computing platform including a plurality of other sensor devices, wherein the cluster computing software is configured to split up the processing of the received sensor data into a plurality of processing jobs, send job processing requests to other sensor devices, receive job processing requests from other sensor devices, combine job processing results from the sent job processing requests to produce processed received sensor data, and wherein the plurality of sensor devices operate as a single machine to process the received sensor data;
receive external cluster processing job requests from one of the plurality of other sensor devices; perform external cluster processing job requests; and send external cluster processing job results to the one of the plurality of other sensor devices; wherein processing the received sensor data includes sending processing job requests to other sensor devices of the plurality of other sensor devices to perform a portion of the processing of the received sensor data and receiving job processing results from the other sensor devices; and wherein performing the external processing requests include sending cluster computing processing requests to cloud resources to perform a portion of the processing of the received sensor data and receiving cluster computing processing results from the cloud resources.

2. The sensor device of claim 1, wherein the processor is further configured to receive external sensor data and process the external sensor data.

3. The sensor device of claim 1, wherein the processor is further configured to connect to a new sensor added to the senor device and to receive data from the new sensor.

4. The sensor device of claim 1, wherein processing the received sensor data includes sending cluster computing processing requests to cloud resources to perform a portion of the processing of the external processing request and receiving cluster computing processing results from the cloud resources.

5. A method of processing data performed by a sensor device including a processor and a plurality of sensors, comprising: receiving sensor data, by the processor, from the plurality of sensors; processing, by the processor, the received sensor data from the plurality of sensors; running, by the processor, cluster computing software so that the processor is part of a distributed cluster computing platform including a plurality of other sensor devices, wherein the cluster computing software is configured to split up the processing of the received sensor data into a plurality of processing jobs, send job processing requests to other sensor devices, receive job processing requests from other sensor devices, combine job processing results from the sent job processing requests to produce processed received sensor data, and wherein the plurality of sensor devices operate as a single machine to process the received sensor data; receiving, by the sensor device, external cluster processing job requests from one of the plurality of other sensor devices; performing, by the processor, external cluster processing job requests; and sending, by the sensor device, external cluster processing job results to the one of the plurality of other sensor devices; wherein processing the received sensor data includes sending processing job requests to other sensor devices of the plurality of other sensor devices to perform a portion of the processing of the received sensor data and receiving job processing results from the other sensor devices; and wherein performing the external processing requests include sending cluster computing processing requests to cloud resources to perform a portion of the processing of the received sensor data and receiving cluster computing processing results from the cloud resources.

6. The method of claim 5, further comprising receiving, by the sensor device, external sensor data and processing, by the processor, the external sensor data.

7. The method of claim 5, further comprising adding a new sensor to the sensor device and connecting the new sensor to the processor.

8. The method of claim 5, wherein processing the received sensor data includes sending cluster computing processing requests to cloud resources to perform a portion of the processing of the external processing request and receiving cluster computing processing results from the cloud resources.

\* \* \* \* \*